US009545604B2

(12) United States Patent
Pan

(10) Patent No.: US 9,545,604 B2
(45) Date of Patent: Jan. 17, 2017

(54) SOLIDS COMBINING SYSTEM FOR A SOLID FEEDSTOCK

(71) Applicant: General Electric Company, Schenectady, NY (US)

(72) Inventor: Edward Pan, Houston, TX (US)

(73) Assignee: General Electric Company, Schenectady, NY (US)

( * ) Notice: Subject to any disclaimer, the term of this patent is extended or adjusted under 35 U.S.C. 154(b) by 147 days.

(21) Appl. No.: 14/082,008

(22) Filed: Nov. 15, 2013

(65) Prior Publication Data

US 2015/0138911 A1    May 21, 2015

(51) Int. Cl.
| | | |
|---|---|---|
| *B01F 3/06* | (2006.01) | |
| *B01F 15/02* | (2006.01) | |
| *B01F 3/18* | (2006.01) | |
| *B01F 5/00* | (2006.01) | |
| *B65G 53/14* | (2006.01) | |

(52) U.S. Cl.
CPC ............... *B01F 3/18* (2013.01); *B01F 5/0057* (2013.01); *B65G 53/14* (2013.01); *Y02E 20/16* (2013.01); *Y02E 20/18* (2013.01)

(58) Field of Classification Search
CPC ............ B01F 3/068; B01F 3/12; B01F 3/125; B01F 2003/125; B01F 5/0057; C10J 2200/152
USPC ....... 366/165.1, 165.2, 165.4, 172.1; 60/737, 60/740; 239/398, 406
See application file for complete search history.

(56) References Cited

U.S. PATENT DOCUMENTS

| | | | |
|---|---|---|---|
| 3,468,487 | A | 9/1969 | Warren |
| 3,721,390 | A | 3/1973 | Jackson |
| 3,960,504 | A | 6/1976 | Griffin |
| 4,333,405 | A | 6/1982 | Michelfelder et al. |
| 4,426,938 | A | 1/1984 | Leikert et al. |
| 4,436,038 | A | 3/1984 | Leikert et al. |
| 4,443,228 | A | 4/1984 | Schlinger |
| 4,466,363 | A | 8/1984 | Leikert et al. |
| 4,501,206 | A | 2/1985 | Leikert |
| 4,552,076 | A | 11/1985 | McCartney |
| 4,570,598 | A | 2/1986 | Samson et al. |
| 4,600,151 | A | 7/1986 | Bradley |
| 4,702,180 | A | 10/1987 | Kiga |
| 4,768,446 | A | 9/1988 | Wilkes et al. |
| 4,846,666 | A | 7/1989 | Bilawa et al. |
| 4,885,999 | A | 12/1989 | Baba et al. |
| 5,061,513 | A | 10/1991 | Flynn et al. |
| 5,174,505 | A | 12/1992 | Shen |
| 5,365,865 | A | 11/1994 | Monro |

(Continued)

FOREIGN PATENT DOCUMENTS

| | | |
|---|---|---|
| CN | 1102246 | 5/1995 |
| CN | 2217192 | 1/1996 |

(Continued)

*Primary Examiner* — Tony G Soohoo
*Assistant Examiner* — Elizabeth Insler
(74) *Attorney, Agent, or Firm* — Fletcher Yoder, P.C.

(57) ABSTRACT

A system includes a solids combining system with a solids mixing section having a mixing chamber and a plurality of solids inlets configured to supply one or more solids into the mixing chamber. The system also includes a solids breakup section having a plurality of fluid inlets configured to supply one or more fluids into the mixing chamber and a solids flow control section having a converging-diverging passage downstream of the mixing chamber.

29 Claims, 5 Drawing Sheets

(56) References Cited

U.S. PATENT DOCUMENTS

| | | | |
|---|---|---|---|
| 5,380,342 A | 1/1995 | Leonard, III et al. | |
| 5,445,325 A | 8/1995 | White | |
| 5,450,724 A | 9/1995 | Kesseli et al. | |
| 5,513,583 A | 5/1996 | Battista | |
| 5,581,998 A * | 12/1996 | Craig | F02C 3/20 60/733 |
| 5,656,044 A | 8/1997 | Bishop et al. | |
| 5,685,242 A | 11/1997 | Narato et al. | |
| 5,803,725 A | 9/1998 | Horn et al. | |
| 5,806,443 A | 9/1998 | Kobayashi et al. | |
| 6,116,171 A | 9/2000 | Oota et al. | |
| 6,237,510 B1 | 5/2001 | Tsumura et al. | |
| 6,289,677 B1 | 9/2001 | Prociw et al. | |
| 6,964,696 B2 | 11/2005 | Malatak et al. | |
| 7,229,483 B2 | 6/2007 | Lewis | |
| 7,434,401 B2 | 10/2008 | Hayashi | |
| 8,091,363 B2 | 1/2012 | Sullivan et al. | |
| 8,236,071 B2 | 8/2012 | Corry et al. | |
| 8,795,602 B2 | 8/2014 | Ergut | |
| 9,033,259 B2 | 5/2015 | Venkatesan | |
| 9,139,788 B2 | 9/2015 | Russell | |
| 2004/0107835 A1 | 6/2004 | Malatak et al. | |
| 2008/0072807 A1 | 3/2008 | Brookes | |
| 2008/0256860 A1 | 10/2008 | Von Kossak-Glowczewski | |
| 2008/0289254 A1* | 11/2008 | Sprouse | C10J 3/54 48/77 |
| 2009/0077889 A1 | 3/2009 | Duca et al. | |
| 2009/0077891 A1 | 3/2009 | Duca et al. | |
| 2009/0272822 A1 | 11/2009 | Davis et al. | |
| 2009/0308205 A1 | 12/2009 | Dry | |
| 2010/0115842 A1 | 5/2010 | Raterman | |
| 2010/0146856 A1 | 6/2010 | Zamansky et al. | |
| 2010/0146857 A1 | 6/2010 | Zamansky et al. | |
| 2010/0146858 A1 | 6/2010 | Zamansky et al. | |
| 2010/0251614 A1 | 10/2010 | Ji | |
| 2013/0175365 A1* | 7/2013 | Ergut | F23D 14/22 239/407 |
| 2014/0305526 A1 | 10/2014 | Ergut | |

FOREIGN PATENT DOCUMENTS

| | | |
|---|---|---|
| CN | 1119723 | 4/1996 |
| CN | 1247290 | 3/2000 |
| CN | 2608844 | 3/2004 |
| CN | 101098750 | 1/2008 |
| CN | 201177258 | 1/2009 |
| CN | 101463257 | 6/2009 |
| CN | 101760245 | 6/2010 |
| EP | 2199375 | 6/2010 |
| RU | 2174649 | 10/2001 |
| WO | 2009042743 | 4/2009 |
| WO | 2009042744 | 4/2009 |
| WO | 2009116275 | 9/2009 |
| WO | 2009134530 | 11/2009 |
| WO | 2010056334 | 5/2010 |

* cited by examiner

SOLIDS COMBINING SYSTEM FOR A SOLID FEEDSTOCK

BACKGROUND

The subject matter disclosed herein relates to solids preparation and/or transport for industrial systems, such as gasifiers, reactors, combustors, and furnaces.

Various industrial systems convey particulate solids, such as solid feedstock, from one apparatus to another. The solid feedstock may include carbonaceous feedstock such as coal; biomass feedstock such as wood chips, corn stover, switch grass, or municipal waste, or any combination thereof. Due to variations in the size, shape, composition, and other characteristics of the solid feedstock, it may be particularly difficult to transport the solid feedstock. In certain applications, the solid feedstock may be transported from an upstream apparatus to a downstream apparatus, wherein the downstream apparatus is at a higher pressure than the upstream apparatus. For example, the downstream apparatus may be a gasifier that uses the solid feedstock as a fuel source to generate syngas. The pressure differential between the upstream and downstream apparatus may further complicate the transportation of solid feedstock. Therefore, a need exists for an improved system and method for transporting a solid feedstock.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a solids combining system with a solids mixing section having a mixing chamber and a plurality of solids inlets configured to supply one or more solids into the mixing chamber. The system also includes a solids breakup section having a plurality of fluid inlets configured to supply one or more fluids into the mixing chamber and a solids flow control section having a converging-diverging passage downstream of the mixing chamber.

In a second embodiment, a system includes a solids combining system, that has a solids mixing section having a mixing chamber and a plurality of solids inlets configured to supply one or more solids into the mixing chamber. The system also includes a solids breakup section having a plurality of fluid inlets configured to supply one or more fluids into the mixing chamber. The plurality of fluid inlets are configured to direct fluid jets to impinge against solids flows from the plurality of solids inlets, and the plurality of fluid inlets are angled about a central region of the mixing chamber to induce a swirling flow in the mixing chamber.

In a third embodiment, a system includes a solids combining system, that has a solids mixing section having a mixing chamber and a plurality of solids inlets configured to supply one or more solids into the mixing chamber. The solids combining system also includes a solids flow control section downstream of the mixing chamber. The solids flow control section includes a converging conduit portion, a diverging conduit portion, and a throat portion between the converging conduit portion and the diverging conduit portion.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The disclosed embodiments are related to a system for conveying and combining solids, such as solid feedstock or other particulate solids. The solids (e.g., particulate solid feedstock) may be directly or indirectly used for downstream systems, such as gasification systems (e.g., gasifiers), reactors, combustors and combustion systems, furnaces, gas treatment systems, chemical production systems, gas turbine engines, and/or combined cycle power plants. The feedstock may include carbonaceous solid feedstock such as coal, or biomass feedstock such as wood chips, corn stover, switch grass, or municipal waste, or any combination thereof. Feedstock may be pumped from solids pumps that compact and/or provide feedstock from multiple sources with varying characteristics. The plants and systems that use the feedstock may run more efficiently when the feedstock is mixed well and is introduced in a consistent size. In certain embodiments discussed in detail below, a solids combining system may be implemented to ensure proper mixing, breakup, and flow of the solids to the downstream systems. The solids combining system also may help resist backflow from a downstream system (e.g., a gasifier) at a higher pressure toward an upstream system at a lower pressure.

Figure 1:
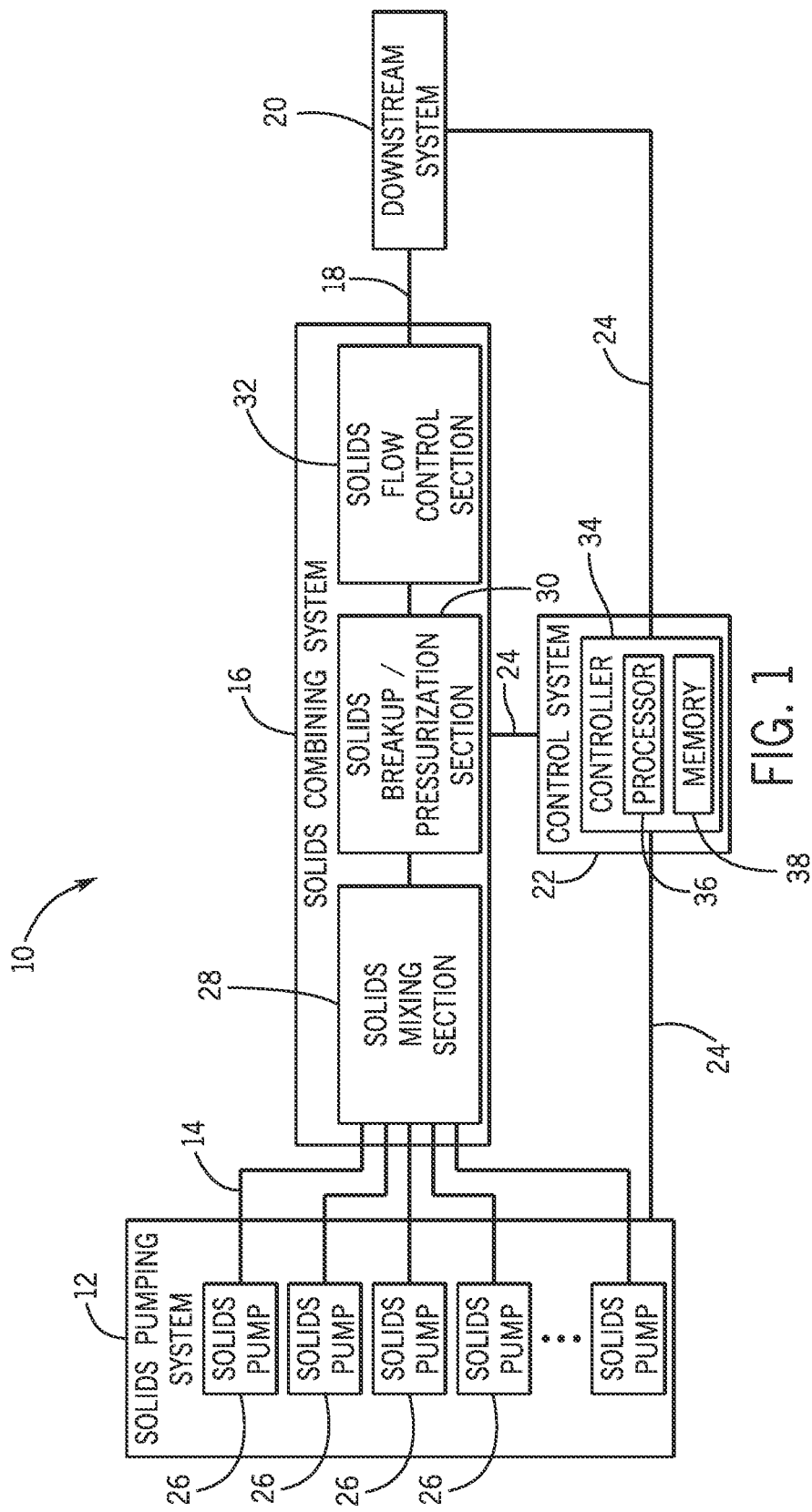
FIG. 1 is a block diagram of an embodiment of a system having a feedstock conveying system with a solids pumping system and a solids combining system.

FIG. 1 is a schematic embodiment of a feedstock conveying system 10. The feedstock conveying system 10 includes a solids pumping system 12 that conveys uncombined feedstock 14 to a solids combining system 16. The solids combining system 16 conveys combined feedstock 18 to one or more downstream systems 20. The downstream systems 20 include any system that may make use of solid feedstock. For example, the downstream system 20 may include a gasifier, a reactor, a gas treatment system, a combustion system, a gas turbine, or any combination thereof. In some embodiments, the downstream system 20 may use the feedstock at a pressure higher than atmospheric pressure. In order to maximize efficiency and maintain the pressure differential of the feedstock conveying system 10, a control system 22 monitors and controls the solids pumping system 12, the solids combining system 16, and the downstream system 20 through electrical and/or communications lines 24.

The solids pumping system 12 includes at least one solids pump 26, such as a plurality of solids pumps 26, that pump the uncombined feedstock 14 to the solids combining system 16. The solids pumps 26 may include pumps that compact and pressurize the feedstock 14 as it goes through the feedstock conveying system 10. The solids pumps 26 may include a number of types and models of pumps from a number of locations and/or storage bins. For example, in the illustrated embodiment, each pump 26 may be used to deliver a separate flow of feedstock to the solids combining system 16. In certain embodiments, the feedstock conveying system 10 may include 2, 3, 4, 5, 6, 7, 8, 9, 10, or more pumps 26 and associated conduits of feedstock 14 directed independently into the solids combining system 16. The control system 22 may control the pumps 26 independently or collectively to provide uniform or different flow rates, pressures, feedstock types, or any combination thereof, to the solids combining system 16. For example, the control system 22 may control the pumps 26 based on sensor feedback from the downstream system 20 or various subsystems of the solids combining system 16.

The solids combining system 16 receives the feedstock 14 from the pumps 26, and passes the feedstock through a solids mixing section 28, a solids breakup/pressurization section 30, and a solids flow control section 32, which may be integrated and/or separate from one another. For example, these sections 28, 30, and 32 may structurally overlap with one another; share common walls, enclosures, or conduits; or include structures that are used in multiple sections. In certain embodiments, the solids mixing section 28 and the solids breakup/pressurization section 30 may share a common housing or enclosure around a chamber, which is used for mixing the feedstock 14, breaking up the feedstock 14, and pressurizing the feedstock 14 (e.g., with one or more external gas supplies providing jets into the chamber). Likewise, the chamber of sections 28 and 30 may be directly coupled to and/or integral with a converging/diverging passage of the solids flow control section 32, which may be used to control the solids flow and resist any backflow from the downstream system 20 (e.g., a gasifier) in an upstream direction toward the pumping system 12.

In certain embodiments, the solids mixing section 28 may induce a swirling flow, a centrifugal flow, and/or turbulence to help mix the feedstock 14 in a more uniform manner. For example, the solids mixing section 28 may induce flow of the feedstock 14 in a circular manner about a chamber, while also creating turbulence to help with mixing. In some embodiments, the solids mixing section 28 includes one or more fluid nozzles (e.g., gas nozzles) configured to direct jets or sheets of fluid (e.g., high pressure, high velocity gas) in an angled or tangential direction within the chamber of the solids mixing section 28, thereby helping to induce a swirling flow, a centrifugal flow, and/or turbulence in the chamber. The one or more jets also may help to fluidize the feedstock 14 in the solids mixing section 28, thereby helping the feedstock 14 to flow more like a fluid.

The solids breakup/pressurization section 30 may help induce shearing forces against the feedstock 14 to help break the feedstock 14 into smaller pieces or particles, and also may add pressure to the feedstock 14 (e.g., gas pressure). For example, the solids breakup/pressurization section 30 may include one or more fluid nozzles (e.g., gas nozzles), such as pneumatic knives, configured to direct jets or sheets of fluid (e.g., high pressure, high velocity gas) in a crosswise direction against the feedstock 14, thereby creating significant shearing or cutting forces against the feedstock 14 to break up the feedstock 14 while also adding pressure to the flow of feedstock 14. In certain embodiments, the one or more fluid nozzles also may be used for inducing mixing in the mixing section 28, as discussed above. The fluid nozzles may direct jets or sheets of gas, such as such as carbon dioxide ($CO_2$), nitrogen ($N_2$), or any combination thereof, which may be compatible and/or used in the downstream system 20. In certain embodiments, the solids breakup/pressurization section 30 helps break up the feedstock 14 that may have been compacted while passing through the solids pumps 26.

The solids flow control section 32 helps to control the flow of feedstock 14 in the downstream direction, while also helping to resist backflow in an upstream direction through the solids combining section 16. For example, as discussed in detail below, the solids flow control section 32 may include a converging/diverging passage, such as a Venturi section, which may create an invisible or dynamic valve to control the pressures and flows in the solids combining section 16. The solids flow control section 32 may be directly coupled to, integrated with, and/or separate from the solids mixing section 28 and the solids breakup/pressurization section 30. The solids flow control section 32 (e.g., converging/diverging passage) may provide energy to the combined feedstock 18, so that the feedstock 18 moves to the downstream system 20. The solids flow control section 32 may also control flow based on the shape of the walls to increase flow velocity. In some embodiments, the solids combining system 16 and the solids flow control section 32 may move the feedstock 18 several meters above the ground.

The control system 22, in some embodiments, may be part of a control system 22 that monitors and controls settings for a power plant, a gasification plant, a chemical production plant, or any combination thereof. The control system 22 includes one or more controllers 34 with a processor 36 and a memory 38, wherein the controller 34 stores computer readable code or instructions on the memory 38, and executes the instructions on the processor 36 to operate the solids pumping system 12, the solids combining system 16, and the downstream system 20. The memory 38 may include, but is not limited to, random access memory (RAM), read only memory (ROM), volatile or non-volatile memory, flash memory, hard drives, optical disks, or any combination thereof. The memory 38 may serve as non-transitory (i.e., not a signal), tangible, computer readable media, which stores the instructions that are executable by the processor 36 of the controller 34. In certain embodiments, the controller 34 may include a startup mode, a steady state mode, and a shutdown mode for operating the solids pumping system 12, the solids combining system 16, and the downstream system 20. Each of these modes may have different parameters for transporting the feedstock 14.

Figure 2:
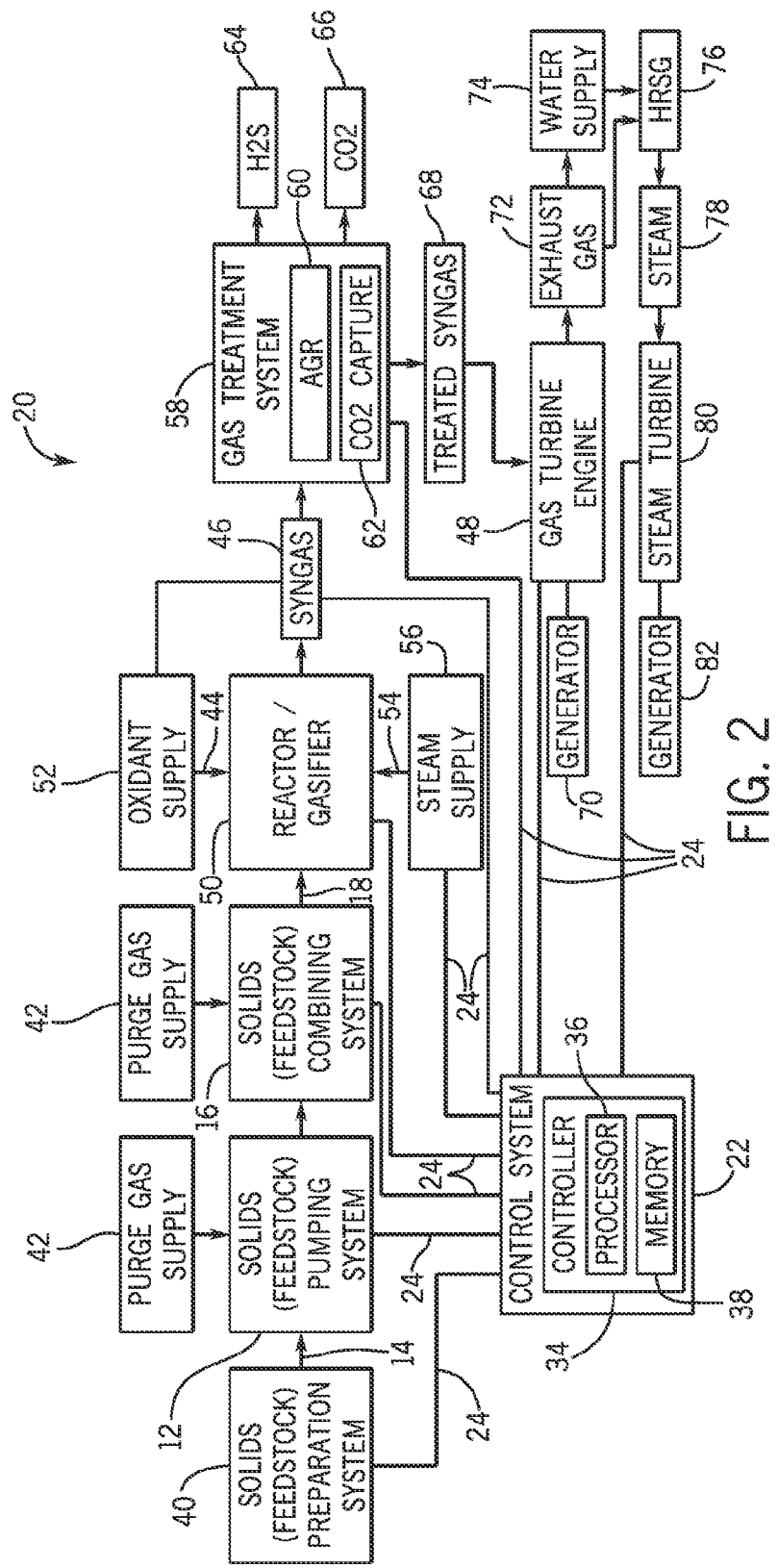
FIG. 2 is a block diagram of an embodiment of a system having the feedstock conveying system of FIG. 1, a gasifier, a gas treatment system, and a combined cycle having a gas turbine and a steam turbine.

FIG. 2 is a block diagram of an embodiment of the feedstock conveying system 10 of FIG. 1 used in a combined cycle power plant. In the illustrated embodiment, the feedstock conveying system 10 includes a solids preparation system 40 that is controlled by the control system 22. The solids preparation system 40 may include grinders or pulverizers that size the solids/feedstock 14 into particles used in the downstream system 20. The feedstock 14 then enters the solids pumping system 12 to increase pressure and/or convey the feedstock 14 from the location of the solids preparation system 40 to the solids combining system 16. The solids pumping system 12 and/or the solids combining system 16 may utilize a purge gas supply 42 to help increase the pressure (e.g., to help resist backflow), fluidize the feedstock 14, purge any undesirable backflow of gases (e.g., syngas from the gasifier), change the composition of the feedstock 14, induce mixing of the feedstock 14, induce breakup of the feedstock 14, or any combination thereof. For example, the purge gas supply 42 may provide $CO_2$ to the feedstock 14 to increase the carbon content and therefore the reactivity of the feedstock 14, while being compatible with the downstream system, e.g., reactor/gasifier. The purge gas supply 42 may add an inert gas, such as $N_2$, to decrease the relative amount of carbon, while also helping to remove any undesirable gases (e.g., backflow of syngas) in the feedstock 14. The purge gas supply 42 also may inject the purge gas through one or more fluid nozzles (e.g., pneumatic nozzles or knives), thereby helping to induce mixing, fluidization, and breakup of the feedstock 14. The purge gas from the purge gas supply 42 may also be removed at a different stage of the solids conveying system 10 or in the downstream system 20.

The downstream system 20 may include, among other things, a reactor and/or a gasifier 44. The reactor/gasifier 44 uses the combined feedstock 18 to make syngas 46 for use within a gas turbine engine 48. The reactor/gasifier 44, as illustrated, may combine the feedstock 18 with an oxidant 50 from an oxidant supply 52 (e.g., an air separation unit), and steam 54 from a steam supply 56 (e.g., a heat recovery steam generator, or HRSG). The oxidant supply 52 and the steam supply 56 may be coupled to the control system 22 so that the control system 22 is able to monitor and control the amounts of the oxidant 50 and the steam 54 to maximize the quality and amount of syngas 46 produced by the reactor/gasifier 44. The syngas 46 is treated by a gas treatment system 58 to remove unwanted components (e.g., acid gases) from the syngas 46. The gas treatment system 58 may include an acid gas removal (AGR) system 60 and a $CO_2$ capture system 62, which result in $H_2S$ 64 and $CO_2$ 66 byproducts. For example, the $CO_2$ capture system 62 may capture and store the $CO_2$ for later use in carbon sequestration, enhanced oil recovery (EOR), or other applications. These byproducts may be recycled into the systems (e.g., feedstock conveying system 10 or downstream system 20) or removed altogether. For example, the captured $CO_2$ may be used by the purge gas supply 42 for the systems 12 and 16.

The gas treatment system 58 produces treated syngas 68 that is delivered to the gas turbine engine 48. In the illustrated embodiment, the gas turbine engine 48 combusts the treated syngas 68 to produce a torque to drive a generator 70, which in turn generates electrical power. The gas turbine engine 48 may also be part of a combined cycle system, wherein exhaust gas 72 from the gas turbine engine 48 is used to heat a water supply 74 and/or is delivered to a heat recovery steam generator (HRSG) 76. The water supply 74 may also supply the HRSG 76 with heat and water. The HRSG 76 uses the heat and water from the exhaust gas 72 and the water supply 74 to produce steam 78, which is used to power a steam turbine 80 that may drive an additional generator 82. The control system 22 may be communicatively coupled (e.g., electrical and/or communication lines) to the gas treatment system 58, the gas turbine engine 48, the steam turbine 80, or any combination thereof, to monitor and control electricity generation and efficiency within each system.

Figure 3:
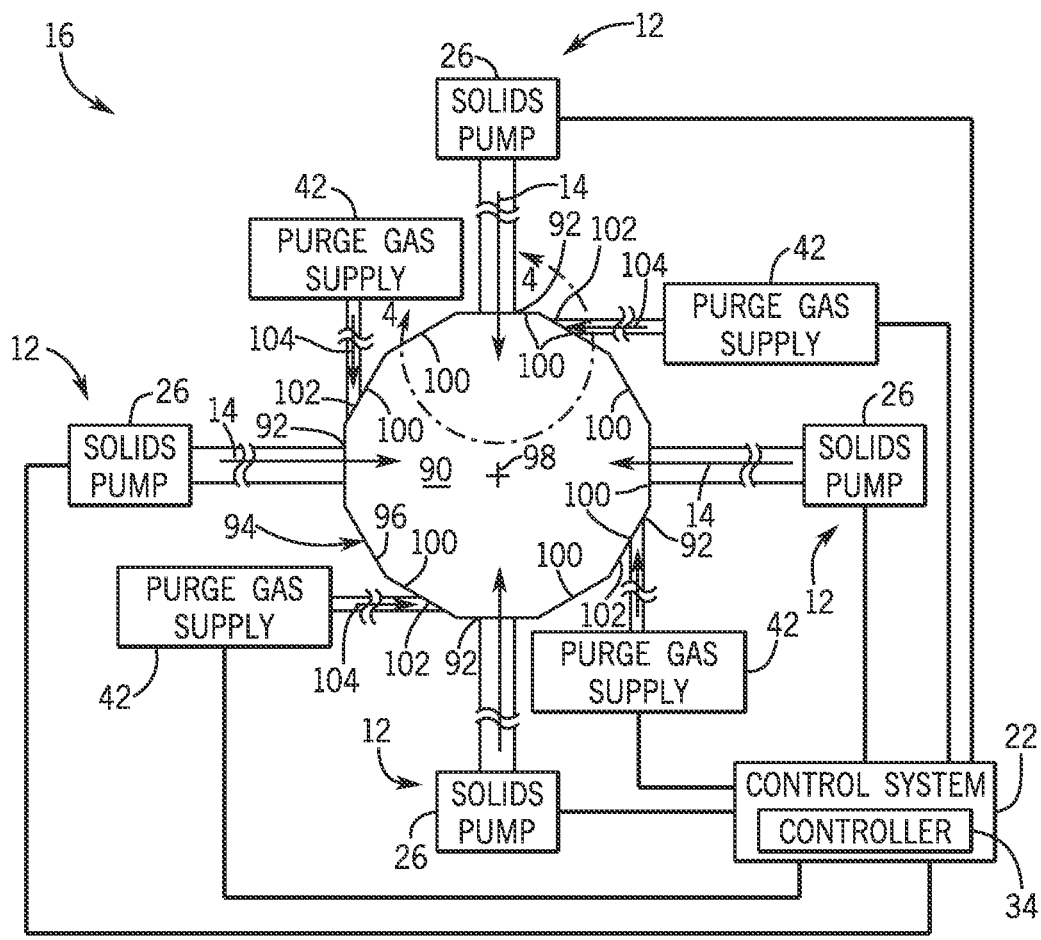
FIG. 3 is a cross-sectional schematic view of an embodiment of the solids combining system of FIGS. 1 and 2.

FIG. 3 is a cross-sectional schematic view of an embodiment of the solids combining system 16 of FIGS. 1 and 2. The solids combining system 16 includes a mixing chamber 90 into which the solids pumps 26 independently deliver the unmixed feedstock 14. The unmixed feedstock 14 enters the mixing chamber 90 through one or more solids inlets 92 (e.g., openings, ports, passages, or nozzles). The mixing chamber 90 also includes and is defined in size by a mixing enclosure 94 surrounding the mixing chamber 90. The mixing enclosure 94 holds the unmixed feedstock 14 for mixing and combining the unmixed feedstock 14 from the various solids pumps 26 into combined feedstock 18. The mixing enclosure 94 includes a first side wall 96 extending around a central axis 98 of the mixing chamber 90, wherein the first side wall 96 of the enclosure 94 extends lengthwise along the central axis 98 toward the solids flow control section 32 as discussed in detail below. The first side wall 96 includes a plurality of panels 100 (e.g., 12 panels) arranged about the central axis 98 to define a polygonal shaped conduit (e.g., non-circular shaped conduit). In certain embodiments, the first side wall 96 may include 2 to 100 panels, such as 2, 3, 4, 5, 6, 7, 8, 9, 10, 11, 12, 13, 14, 15, 16, or more panels 100. These panels 100 help induce mixing of the feedstock 14, and thus may be described as forming one or more recesses, protrusions, or mix-inducing features. These panels 100 also may be combined with one or more additional recesses, protrusions, or mix-inducing features, such as pegs, airfoils, nubs, or other flow turbulators.

Each of the panels 100 may include one of the solids inlets 92 or, as illustrated, the mixing enclosure 94 may include panels 100 that do not have solids inlets 92. Furthermore, each panel 100 may have more than one solids inlet 92, e.g., 1, 2, 3, 4, 5, 6, 7, 8, 9, or 10 inlets 92 per panel 10. For example, in the illustrated cross-section, four solids pumps 26 and four solids inlets 92 are shown. In a different cross-section of the same embodiment (e.g., a cross-section further into the page or above the page) 1, 2, 3, 5, or more of the panels may have solids inlets 92 connected to solids pumps 26. In other words, while the illustrated embodiment shows a symmetrical formation of pumps 26 and inlets 92, other asymmetrical arrangements may also be used. These inlets 92 may be angled perpendicular to the panels 100 of the first side wall 96 as shown, or the inlets 92 may be angled generally parallel or tangent to the panels 100 of the first side wall 96, or the inlets 92 may be oriented at acute angles relative to the panels 100 of the first side wall 96, or any combination thereof. In certain embodiments, the acute angles may range between approximately 0 to 90, 10 to 80, 20 to 70, 30 to 60, 40 to 50, 10 to 45, or 15 to 30 degrees. In the illustrated embodiment, the inlets 92 are arranged in pairs of directly opposing inlets 92, such that the inlets 92 direct the feedstock 14 in directly opposite directions toward the axis 98 in a converging manner. This convergence of flows may facilitate mixing and breakup of the feedstock 14.

The mixing enclosure 94 also includes fluid inlets 102 (e.g., liquid and/or gas inlet nozzles) configured to supply one or more fluids into the mixing chamber 90 in the form of focused jets, thin sheets forming a fluid-knife (e.g., pneumatic knife), or any combination thereof. The fluid inlets 102 supply a fluid 104 (e.g., liquid and/or gas) that produces a swirling motion within the mixing chamber 90, e.g., a flow that swirls, circulates, centrifuges, or generally flows circumferentially around the axis 98 in the enclosure 94. For example, the fluid inlets 102 may be oriented generally tangent, parallel, or at acute angles to the panels 100 of the first side wall 94. In certain embodiments, the acute angles of the fluid inlets 102 may be less than approximately 5, 10, 15, 20, 25, or 30 degrees. The purge gas supply 42 may supply fluid to the fluid inlets 102 from one or more sources, such as fluid storage tanks, compressors, gas treatment units, carbon capture systems, or any combination thereof. For example, the fluid may include carbon dioxide ($CO_2$), one or more inert gases such as nitrogen ($N_2$), one or more compatible gases relative to the downstream process, or any combination thereof.

The solids inlets 92 and the fluid inlets 102 may be oriented generally crosswise to one another, such as angles between approximately 30 to 90, 40 to 90, 50 to 90, 60 to 90, 70 to 90, or 80 to 90 degrees. In the illustrated embodiment, the solids inlets 92 and the fluid inlets 102 are oriented generally perpendicular to one another. The fluid 104 (e.g., liquid or gas) from the fluids inlet 102 impinges (e.g., in a crosswise manner) upon the unmixed feedstock 14 exiting through the solids inlet 92. The fluid 104, which may form a focused jet or sheet of high velocity, high pressure fluid, chops or cuts the unmixed feedstock 14 into particulates and induces motion in the direction of flow of the fluid 104 in a circular manner around the axis 98. The illustrated embodiment includes four pairs of solids inlets 92 and fluid inlets 102. Other embodiments may include 2, 3, 4, 5, 6, 7, 8, 9, 10 or more pairs of inlets 92, 102. Each pair of solids inlets 92 and fluid inlets 102 may be equally spaced around the circumference of the mixing enclosure 94, or the pairs of solids inlets 92 and fluid inlets 102 may be unequally spaced. As described above with respect to the solids inlets 102, the formation of the pairs of solids inlets 92 and fluid inlets 102 may be symmetrical or asymmetrical.

The fluid inlet 102 may include a circular port, an oval port, a square port, a rectangular port, a polygonal port, a slit-shaped port, a plurality of ports, or any combination thereof, to chop the unmixed feedstock into particulates. For example, the fluid inlets 102 may have a rectangular or slit-shaped port with a length/width ratio between approximately 50:1 to 2:1, 40:1 to 3:1, 30:1 to 4:1, 20:1 to 5:1, or any combination thereof. The shape of the port of the fluid inlet 102 may be determined by the desired speed and chopping effect of the fluid flow. For example, a slit-shaped port may provide a sharper chopping edge to the feedstock 14, but may not provide as much gas flow to produce swirl within the mixing chamber 90. On the other hand, a round or square port may provide more fluid 104 to induce swirl. In certain embodiments, the fluid inlet 102 may have a slit-shaped port or rectangular port with an adjustable length/width ratio (e.g., controlled by control system 22), thereby enabling adjustments of the flow properties (e.g., flow rate, velocity, pressure, shearing force, etc.) on the fly. For example, the length/width ratio may be adjusted by the control system 22 between approximately 2:1 to approximately 20:1, between approximately 3:1 to approximately 15:1, or between approximately 4:1 to approximately 10:1, or any combination thereof.

In addition to adjusting the shape and size of the fluid inlet 102, the speed and velocity of the fluid 104 may also be adjusted by the control system 22. Depending on the distance and height that the combined feedstock 18 will travel, some embodiments may configure each fluid inlet 102 and/or control each purge gas supply 42 (e.g., pressure, flow rate, velocity) to output the fluid flow with a mach number from less than approximately 0.1 to greater than approximately 10. In some embodiments, each fluid inlet 102 may be configured to output a fluid flow with a mach number of between approximately 0.1 to 10, 0.1 to 5, or 0.15 to 3 by setting a geometry of the fluid inlet 102, controlling an adjustable opening of the fluid inlet 102 via the control system 22, and/or controlling a pressure, flow rate, and/or velocity of the fluid flow through the fluid inlet 102 from the purge supply 42 via the control system 22. In some embodiments, each fluid inlet 102 may be configured to output a fluid flow with a mach number greater than approximately 0.1, 0.2, 0.3, 0.4, or 0.5. The swirling motion produced inside the mixing chamber 90 continues the breaking up and the mixing that was started by the impingement of flows from the fluid inlet 102 and the solids inlet 92. Thus, the mixing chamber 90 converts the unmixed feedstock 14 into combined feedstock 18, which is used in the downstream system(s) 20. The control system 22 monitors and controls aspects of the purge gas supply 42 and the solids pump 26 to change the amount of swirl, pressure, and/or other factors which affect the downstream system 20.

In the illustrated embodiment of FIG. 3, the solids mixing section 28 and the solids breakup/pressurization section 30 are integrated with one another, and share features that serve functions of mixing, solids breakup, and pressurization. For example, the panels 100 of the enclosure 94 help to induce both mixing and breakup of the feedstock 14 in the chamber 90. By further example, the relative orientation between the inlets 92 and inlets 102 helps to induce both mixing and breakup of the feedstock 14, because the inlets 92 and 102 direct the fluid and feedstock in crosswise directions to one another causing impingement between the flows, while also directing the flows to move circumferentially about the axis 98 of the chamber 90 to undergo additional mixing and breakup. Thus, in the illustrated embodiment, these features may be considered part of both the solids mixing section 28 and the solids breakup/pressurization section 30. In other embodiments, the solids mixing section 28 and the solids breakup/pressurization section 30 each may include one or more of the features discussed above, including the panels 100 or other flow turbulators, angled inlets 92, angled inlets 102, or any combination thereof.

Figure 4:
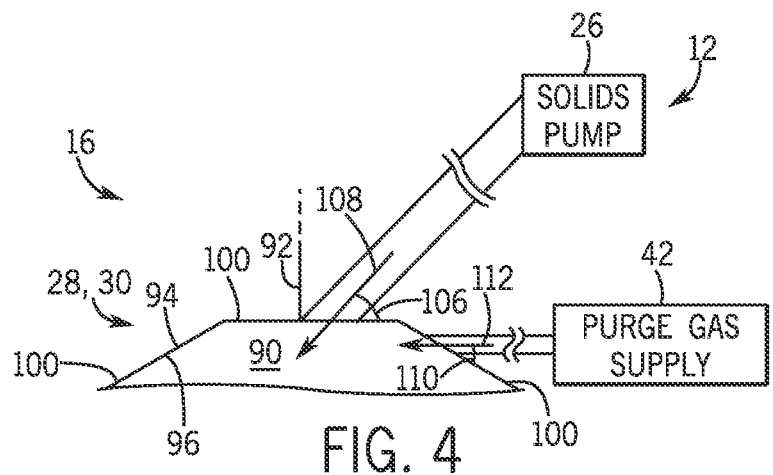
FIG. 4 is a partial cross-sectional schematic view of an embodiment of the solids combining system of FIGS. 1-3, taken within line 4-4 of FIG. 3, further illustrating angular orientations of a solids pump and a purge gas supply.

FIG. 4 is a partial cross-sectional schematic view of an embodiment of the solids combining system 16 of FIGS. 1-3, taken within line 4-4 of FIG. 3, further illustrating angular orientations of a solids pump and a purge gas supply. In the illustrated embodiment, the solids inlet 92 connects to the mixing enclosure 94 at a first angle 106 along a first axis 108. The fluid inlet 102 connects to the mixing enclosure 94 at a second angle 110 along a second axis 112. The first angle 106 and the second angle 110 may be the same or different from one another. The first and second angles 106 and 110 may range between approximately 0 to 90, 10 to 80, 15 to 75, 20to 70, 30 to 60, 40 to 50, 45 to 60, 10 to 30, or 15 to 45 degrees. For example, the first and second angles 106 and 110 may include 0 degrees (i.e., parallel), 90 degrees (i.e., perpendicular), or acute angles between 0 and 90 degrees. For example, as illustrated in FIG. 4, the first angle 106 and the second angle 110 may both be parallel to an adjacent panel 100 of the mixing enclosure 94. Furthermore, the first axis 108 may be crosswise (e.g., orthogonal or acutely angled) to the second axis 112. In the embodiment of FIG. 4, the first axis (or axes) 108 and the second axis (or axes) 112 are angled generally circumferentially around the axis 98 of the chamber 98, while the embodiment of FIG. 3 has the first axis (or axes) 108 angled inwardly toward the axis 98 of the mixing chamber 90 while having the second axis (or axes) 112 angled generally circumferentially around the axis 98 of the chamber 98. The circumferential orientation of one or both of the axes 108 and/or 112 helps to induce a swirling and/or centrifugal flow around the axis 98 of the mixing chamber 90. The first angle 106 may be determined by the type of solids flowing into the mixing chamber 90, the size of the mixing chamber 90, the speed of the unmixed feedstock 14 from the solids pump 26, or any combination of these or other factors.

Figure 5:
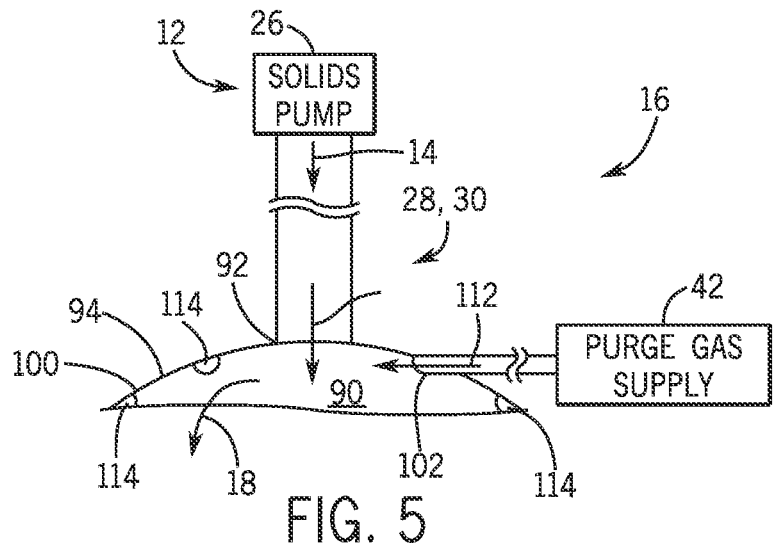
FIG. 5 is a partial cross-sectional schematic view of an embodiment of the solids combining system of FIGS. 1-3, taken within line 4-4 of FIG. 3, further illustrating turbulators along an interior of the solids combining system.

FIG. 5 is a partial cross-sectional schematic view of an embodiment of the solids combining system 16 of FIGS. 1-3, taken within line 4-4 of FIG. 3, further illustrating turbulators 114 along an interior of the solids combining system 16. The first axis 108 of the solids inlet 92 and the second axis 112 of the fluids inlet 102 are crosswise as described earlier with regard to FIGS. 3 and 4. In the illustrated embodiment of FIG. 5, however, the mixing enclosure 94 does not include the plurality of panels 100 (e.g., flat panels) to define the first side wall 96, but instead includes one round panel 100 defining the first side wall 94 (e.g., an annular side wall 94). The fluid inlet 102 impinges the fluid flow (e.g., $CO_2$, $N_2$, or other purge gas flow) on the solid feedstock 14 entering through the solids inlet 92 and induces a swirling motion around the interior of the mixing enclosure 94. The illustrated embodiment of FIG. 5 includes turbulators 114 to introduce turbulent flow of the solids within the mixing chamber 90. Turbulent flow may enhance mixing of the combined feedstock 18. The illustrated turbulators 114 may include protrusions, such as nubs, pegs, airfoils, semi-circular lumps, or any combination thereof. The turbulators 114 also may include recesses, or a combination of recesses and protrusions.

Figure 6:
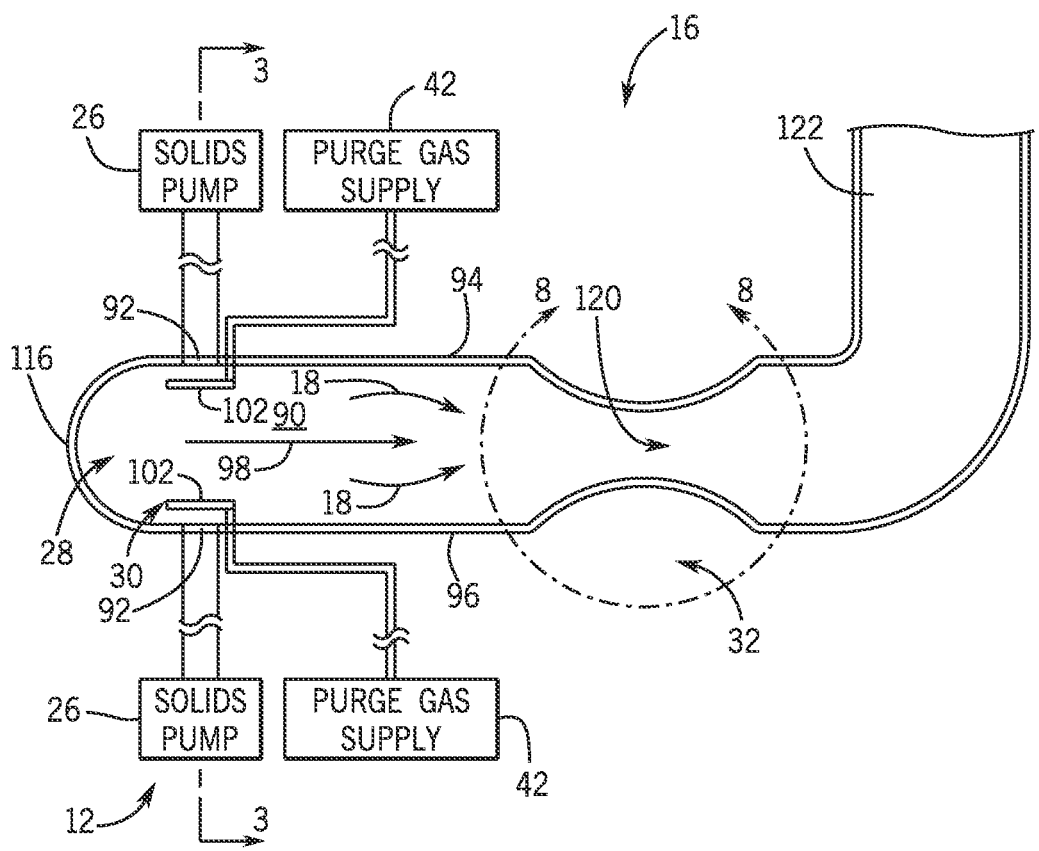
FIG. 6 is a cross-sectional side view of an embodiment of the solids combining system of FIGS. 1-5.

FIG. 6 is a cross-sectional side view of an embodiment of the solids combining system 16 of FIGS. 1-5. The illustrated embodiment includes the mixing chamber 90 formed by the mixing enclosure 94. The solids inlets 92 and the fluid inlets 102 are shown attached through the mixing enclosure 94. While only two solids inlets 92 and fluid inlets 102 are illustrated, the mixing enclosure 94 may include any number of inlets 92 and 102, such as between 1 to 1000, 2 to 500, 2 to 250, 2 to 100, 2 to 50, or 2 to 10. Each pair of inlets 92 and 102 may facilitate mixing and breakup of the solid feedstock 14. In the illustrated embodiment, each fluid inlet 102 has a slit-shaped nozzle or rectangular shaped nozzle with an elongated opening, e.g., a length/wide ratio of greater than or equal to approximately 2:1, 3:1, 4:1, 5:1, 6:1, 7:1, 8:1, 9:1, or 10:1. The length of these fluid inlets 102 may be sized at least equal to or greater than a width or diameter of the solids inlets 92, such that the fluid inlets 102 create a fluid sheet (or pneumatic knife) that completely overlaps the incoming flow of solid feedstock 14 through the inlets 92. Therefore, the fluid inlets 102 are able to cut through the entirety of the incoming solids feedstock 14 flow into the enclosure 94. In certain embodiments, as discussed above, the inlets 92 and/or the inlets 102 may be angled to induce swirling flow around the axis 98 of the enclosure 94, or the inlets 92 and/or the inlets 102 may be angled to converge directly toward the axis 98 without inducing swirl, or a combination of swirl inducing and non-swirl inducing inlets 92 and 102 may be used in the enclosure 94.

The mixing enclosure 94 has an axial end wall 116 extending across the central axis 98 radially between the first side wall 96, thereby creating an end boundary for the mixing chamber 90. In the illustrated embodiment, the axial end wall 116 curves outwardly away from the mixing chamber 90, and thus defines a curved axial end wall 116. For example, the curved axial end wall 116 may be a concave end wall having a semi-spherical shape to facilitate further swirling flow and recirculation of the solid feedstock 14 and fluid (e.g., combined feedstock 18) from the purge gas supply 42. The axial end wall 116 blocks the combined feedstock 18 from exiting the mixing chamber 90 except in the direction of a flow control section 32.

Downstream from the solids mixing section 28 and the solids breakup/pressurization section 30, the solids combining system 16 has the solids flow control section 32 with a flow control conduit 120 configured to control the flow and pressure of solids feedstock, while also serving as an invisible valve to block backflow in an upstream direction toward the sections 28 and 30. As described below with regard to FIG. 8, the flow control conduit 120 has a converging-diverging geometry, such as a Venturi section, to control the flow from the sections 28 and 30 toward a downstream transport pipe 122, which routes the feedstock toward the downstream system 20.

Figure 7:
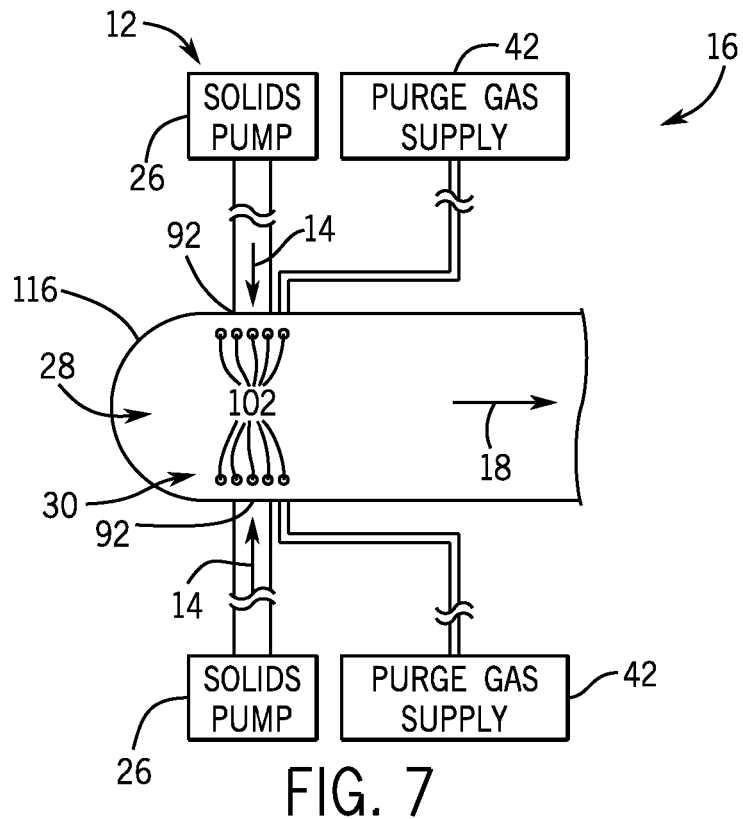
FIG. 7 is a partial cross-sectional side view of an embodiment of the solids combining system of FIG. 6.

FIG. 7 is a partial cross-sectional side view of an embodiment of the solids combining system 16 of FIG. 6. In the embodiment of FIG. 7, each solids inlet 92 is associated with a plurality of fluid inlets 102, such as one or more rows, columns, groups, or sets of closely spaced inlets 102. For example, the illustrated embodiment has at least one row of fluid inlets 102 spanning a width or diameter (or greater) of the solids inlet 92, thereby enabling a plurality of fluid jets to span the entirely of the incoming solids feedstock 14 from the respective inlet 92. Each of the fluid inlets 102 impinges on the unmixed feedstock 14 to break up the feedstock and the mix it into combined feedstock 18. Each set of inlets 102 may include circular inlets, oval inlets, polygonal inlets, rectangular inlets, or any combination thereof.

Figure 8:
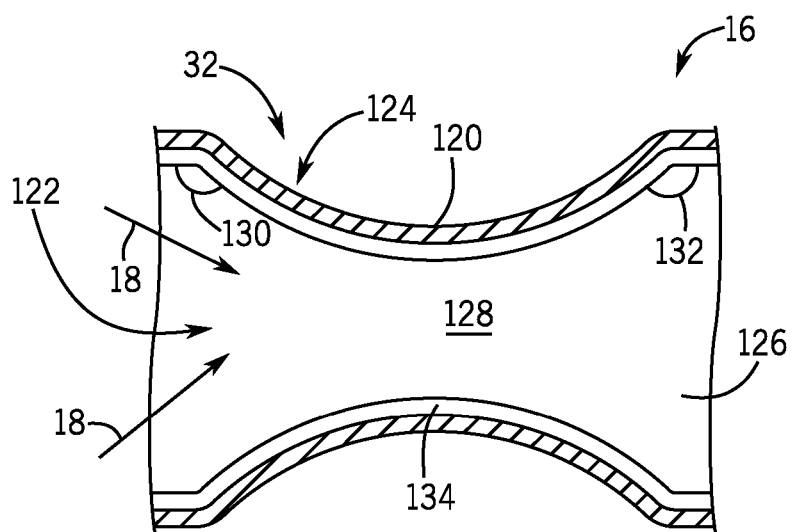
FIG. 8 is a partial cross-sectional side view of an embodiment of the solids combining system of FIG. 6, taken within line 8-8.

FIG. 8 is a partial cross-sectional side view of an embodiment of the solids combining system 16 of FIG. 6, taken within line 8-8. The solids flow control section 32 includes the flow control conduit 120 with a converging-diverging passage 122, such as a Venturi section. The flow control conduit 120 includes a converging conduit portion 124, a diverging conduit portion 126, and a throat portion 128 between the converging conduit portion 124 and the diverging conduit portion 126. The converging conduit portion 124 may have one or more converging conical walls, converging curved annular walls, or a combination thereof, wherein a diameter of the converging conduit portion 124 gradually decreases in the downstream direction toward the throat portion 128. For example, the converging conduit portion 124 has a converging angle 130 (e.g., constant or gradually decreasing angle) that decreases the cross-sectional area of flow for the combined feedstock 18, thereby increasing the velocity and reducing the pressure in the downstream direction through the converging conduit portion 124 to the throat portion 128. The diverging conduit portion 126 may have one or more diverging conical walls, diverging curved annular walls, or a combination thereof, wherein a diameter of the diverging conduit portion 126 gradually increases in the downstream direction away from the throat portion 128. For example, the diverging conduit portion 126 has a diverging angle 132 (e.g., constant or gradually increasing angle) that increases the cross-sectional area of flow for the combined feedstock 18, thereby decreasing the velocity and increasing the pressure in the downstream direction from the throat portion 128 through the diverging conduit portion 126. In this manner, the converging-diverging passage 122 serves as an invisible check valve (e.g., an artificial barrier) that keeps the combined feedstock 18 flowing from the converging portion 124 to the diverging portion 126 through the converging-diverging passage 122, thereby resisting backflow in an upstream direction toward the sections 28 and 30. The converging angle 130 and the diverging angle 132 may both be between 90 and 180 degrees.

In the illustrated embodiment, the flow control conduit 120 has one or more protective layers 134, such as coatings, to resist erosion, corrosion, or a combination thereof. For example, the protective layers 134 may include one or more metal layers, ceramic layers, cermet layers, tungsten carbide layers, or any combination thereof. The layers may have a Rockwell hardness of greater than approximately 50, 60, 70, or 80. Thus, the protective layers 134 may help to protect the flow control conduit 120 along the converging-diverging passage 122 as the flow changes in velocity and pressure.

Technical effects of the invention include a solids combining system 16 that includes a solids mixing section 28, a solids breakup/pressurization section 30, and a solids flow control section 32. The solids mixing section 28 may include a mixing chamber 90 into which unmixed feedstock 14 is delivered and mixed with a swirling motion. The swirling motion can also break up the unmixed feedstock 14 which may have compressed together during pumping. The solids breakup/pressurization section 30 may include solid inlets 92 that deliver the unmixed feedstock 14, and fluid inlets 102 that impinge a fluid (e.g., a purge gas) across the unmixed feedstock 14 to both increase pressure and breakup the solid feedstock 14. The flow control section 32 may include a flow control conduit 120 that includes a converging conduit portion 124, a diverging conduit portion 126, and a throat portion 128 between the converging conduit portion 124 and the diverging conduit portion 126. The flow control section 32 controls the flow of the combined feedstock 18, so that the combined feedstock 18 constantly progresses forward to the downstream system 20.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
   a solids combining system, comprising:
   a solids mixing section comprising a wall around a mixing chamber and a plurality of solids inlets configured to supply one or more solids into the mixing chamber;
   a solids breakup section having a plurality of fluid inlets configured to supply one or more fluids into the mixing chamber, wherein the plurality of fluid inlets and the plurality of solids inlets are arranged in a plurality of sets, wherein each set of the plurality of sets comprises at least one solid inlet and at least one fluid inlet, and wherein each set of the plurality of sets is spaced about the wall around the mixing chamber, and wherein a solids flow from the at least one solid inlet is oriented in a radial inward direction relative to a central axis of the mixing chamber, and wherein a fluid flow from the at least one fluid inlet is oriented in a crosswise direction relative to the radial inward direction to impinge the fluid flow against the solids flow from a corresponding solids inlet; and
   a solids flow control section having a converging-diverging passage downstream of the mixing chamber.

2. The system of claim 1, comprising a downstream system coupled to the solids combining system, wherein the downstream system comprises a gasifier.

3. The system of claim 1, wherein the mixing chamber comprises a first side wall extending around the central axis of the mixing chamber, and the mixing chamber comprises an axial end wall extending across the central axis between the first side wall, wherein the solids breakup section is disposed between the axial end wall and the solids flow control section, wherein the plurality of solids inlets are coupled to the first side wall and are spaced about the central axis, wherein the plurality of fluids inlets are coupled to the first side wall and are spaced about the central axis.

4. The system of claim 3, wherein the axial end wall curves outwardly away from the mixing chamber, and the converging-diverging passage is disposed along the central axis of the mixing chamber.

5. The system of claim 3, wherein the first side wall comprises a plurality of turbulators configured to enhance mixing in the mixing chamber.

6. The system of claim 3, wherein the first side wall comprises a plurality of panels arranged about the central axis to define a polygonal shaped interior.

7. The system of claim 3, wherein the plurality of solids inlets are coupled to the first side wall at first angles relative to the first side wall, the plurality of fluid inlets are coupled to the first side wall at second angles relative to the first side wall, and the first and second angles are different from one another.

8. The system of claim 3, wherein the solids flow control section comprises a flow control conduit having the converging-diverging passage, the flow control conduit comprises a converging conduit portion, a diverging conduit portion downstream from the converging conduit portion, and a throat portion between the converging conduit portion and the diverging conduit portion.

9. The system of claim 1, wherein the plurality of solids inlets have first inlet axes, the plurality of fluid inlets have second inlet axes, and the first and second inlet axes are oriented crosswise to one another.

10. The system of claim 9, wherein the first inlet axes are angled inwardly toward the central axis of the mixing chamber, and the second inlet axes are angled circumferentially about the central axis of the mixing chamber to induce a swirling flow in the mixing chamber.

11. The system of claim 1, wherein each set of the plurality of sets has at least two fluid inlets oriented to impinge the fluid flow against the solids flow from the corresponding solids inlet.

12. The system of claim 1, wherein the plurality of sets comprises at least four sets of solids inlets and fluid inlets.

13. The system of claim 1, wherein each set of the plurality of sets has the at least one fluid inlet oriented substantially parallel or tangential to an interior surface of the mixing chamber adjacent the corresponding solids inlet.

14. The system of claim 13, wherein the at least one fluid inlet is configured to output the fluid flow with a mach number of between approximately 0.15 and 3.

15. The system of claim 13, wherein the at least one fluid inlet comprises at least one of an elongated port or a plurality of ports.

16. A system, comprising:
a solids combining system, comprising:
a solids mixing section comprising a wall around a mixing chamber and a plurality of solids inlets configured to supply one or more solids into the mixing chamber; and
a solids breakup section having a plurality of fluid inlets configured to supply one or more fluids into the mixing chamber, wherein the plurality of fluid inlets and the plurality of solids inlets are arranged in a plurality of sets, wherein each set of the plurality of sets comprises at least one solid inlet and at least one fluid inlet, and wherein each set of the plurality of sets is spaced about the wall around the mixing chamber, and wherein a solids flow from the at least one solid inlet is oriented in a radial inward direction relative to a central axis of the mixing chamber, and wherein a fluid flow from the at least one fluid inlet is oriented in a crosswise direction relative to the radial inward direction to impinge the fluid flow against the solids flow from a corresponding solids inlet, and the plurality of fluid inlets are angled about a central region of the mixing chamber to induce a swirling flow in the mixing chamber.

17. The system of claim 16, comprising a solids flow control section downstream of the mixing chamber, wherein the solids flow control section comprises a converging conduit portion, a diverging conduit portion downstream from the converging conduit portion, and a throat disposed between the converging and diverging conduit portions.

18. The system of claim 16, wherein the solids mixing section comprises a plurality of turbulators disposed about the mixing chamber.

19. A system, comprising:
a solids combining system, comprising:
a solids mixing section comprising a wall around a mixing chamber and a plurality of solids inlets configured to supply one or more solids into the mixing chamber;
a solids breakup section having a plurality of fluid inlets configured to supply one or more fluids into the mixing chamber, wherein the plurality of fluid inlets and the plurality of solids inlets are arranged in a plurality of sets, wherein each set of the plurality of sets comprises at least one solid inlet and at least one fluid inlet, and wherein each set of the plurality of sets is spaced about the wall around the mixing chamber, and wherein a solids flow from the at least one solid inlet is oriented in a radial inward direction relative to a central axis of the mixing chamber, and wherein a fluid flow from the at least one fluid inlet is oriented in a crosswise direction relative to the radial inward direction to impinge the fluid flow against the solids flow from a corresponding solids inlet;
a solids flow control section downstream of the mixing chamber, wherein the solids flow control section comprises a converging conduit portion, a diverging conduit portion downstream from the converging conduit portion, and a throat portion between the converging conduit portion and the diverging conduit portion; and
a gasifier disposed downstream from the solids combining system.

20. The system of claim 1, wherein a first fluid inlet of the plurality of fluid inlets is oriented to impinge the fluid flow against the solids flow from a first solids inlet of the plurality of solids inlets, and the first fluid inlet has a length/width ratio greater than the first solids inlet.

21. The system of claim 1, wherein at least one of the plurality of fluid inlets has the length/width ratio between 2:1 and 20:1.

22. The system of claim 9, wherein the first and second inlet axes are oriented between 70 to 90 degrees relative to one another.

23. The system of claim 16, wherein each fluid inlet of the plurality of fluid inlets has a length/width ratio greater than each solids inlet of the plurality of solids inlets.

24. The system of claim 16, wherein each fluid inlet of the plurality of fluid inlets has the length/width ratio between 2:1 and 20:1.

25. The system of claim 19, wherein each set of the plurality of sets has the at least one fluid inlet oriented substantially parallel or tangential to an interior surface of the mixing chamber adjacent the corresponding solids inlet.

26. The system of claim 1, comprising a control system configured to control the supply of the one or more solids and the supply of the one or more fluids into the mixing chamber of the solids combining system.

27. The system of claim 26, comprising a solids pumping system coupled to the control system and the solids combining system, wherein the control system is configured to control the solids pumping system to control the supply of the one or more solids into the mixing chamber of the solids combining system.

28. The system of claim 16, comprising a control system configured to control the supply of the one or more solids into the mixing chamber of the solids combining system.

29. The system of claim 19, comprising a solids pumping system coupled to the solids combining system, wherein the solids pumping system is configured to pump the supply of the one or more solids into the mixing chamber of the solids combining system.

* * * * *